(12) United States Patent
Hutton et al.

(10) Patent No.: US 7,921,279 B2
(45) Date of Patent: Apr. 5, 2011

(54) OPERAND AND RESULT FORWARDING BETWEEN DIFFERENTLY SIZED OPERANDS IN A SUPERSCALAR PROCESSOR

(75) Inventors: David S. Hutton, Tallahassee, FL (US); Fadi Y. Busaba, Poughkeepsie, NY (US); Bruce C. Giamei, Poughkeepsie, NY (US); Christopher A. Krygowski, Lagrangeville, NY (US); Edward T. Malley, New Rochelle, NY (US); Jeffrey S. Plate, Poughkeepsie, NY (US); John G. Rell, Jr., Saugerties, NY (US); Chung-Lung Kevin Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 12/051,792

(22) Filed: Mar. 19, 2008

(65) Prior Publication Data
US 2009/0240922 A1 Sep. 24, 2009

(51) Int. Cl.
G06F 9/30 (2006.01)
(52) U.S. Cl. .......................... 712/218; 712/220
(58) Field of Classification Search .......... None
See application file for complete search history.

(56) References Cited

U.S. PATENT DOCUMENTS

| | | | |
|---|---|---|---|
| 5,640,588 A * | 6/1997 | Vegesna et al. | 712/23 |
| 5,790,826 A | 8/1998 | Thusoo et al. | |
| 5,867,724 A * | 2/1999 | McMahon | 712/22 |
| 5,892,936 A | 4/1999 | Tran et al. | |
| 5,963,723 A | 10/1999 | Le | |
| 6,049,860 A * | 4/2000 | Krygowski et al. | 712/25 |
| 6,138,230 A * | 10/2000 | Hervin et al. | 712/216 |
| 6,209,081 B1 | 3/2001 | Kahle et al. | |
| 6,324,640 B1 | 11/2001 | Le et al. | |
| 6,542,986 B1 | 4/2003 | White | |
| 6,604,190 B1 | 8/2003 | Tran | |

(Continued)

OTHER PUBLICATIONS z/Architecture Principles of Operation, International Business Machines Corporation, SA22-7832-05, Sixth Edition (Apr. 2007).

Primary Examiner — Eddie P Chan
Assistant Examiner — Idriss N Alrobaye
(74) Attorney, Agent, or Firm — Cantor Colburn LLP; John Campbell (57) ABSTRACT

Result and operand forwarding is provided between differently sized operands in a superscalar processor by grouping a first set of instructions for operand forwarding, and grouping a second set of instructions for result forwarding, the first set of instructions comprising a first source instruction having a first operand and a first dependent instruction having a second operand, the first dependent instruction depending from the first source instruction; the second set of instructions comprising a second source instruction having a third operand and a second dependent instruction having a fourth operand, the second dependent instruction depending from the second source instruction, performing operand forwarding by forwarding the first operand, either whole or in part, as it is being read to the first dependent instruction prior to execution; performing result forwarding by forwarding a result of the second source instruction, either whole or in part, to the second dependent instruction, after execution; wherein the operand forwarding is performed by executing the first source instruction together with the first dependent instruction; and wherein the result forwarding is performed by executing the second source instruction together with the second dependent instruction.

16 Claims, 5 Drawing Sheets

U.S. PATENT DOCUMENTS

| | | |
|---|---|---|
| 6,658,554 B1 * | 12/2003 | Moshovos et al. ............ 712/216 |
| 6,701,427 B1 * | 3/2004 | Hinds et al. .................. 712/244 |
| 6,725,359 B2 * | 4/2004 | Col .............................. 712/219 |
| 6,981,130 B2 * | 12/2005 | Gupte et al. .................. 712/218 |
| 7,111,152 B1 * | 9/2006 | Cofler et al. ................. 712/216 |
| 2003/0140217 A1 * | 7/2003 | Luick ............................ 712/218 |
| 2004/0139299 A1 * | 7/2004 | Busaba et al. ................ 712/218 |
| 2004/0139300 A1 * | 7/2004 | Busaba et al. ................ 712/218 |
| 2005/0138607 A1 | 6/2005 | Lu |
| 2006/0271768 A1 * | 11/2006 | Williamson et al. .......... 712/218 |
| 2009/0254735 A1 * | 10/2009 | Col et al. ...................... 712/208 |

* cited by examiner

REGISTER RESULT-FORWARDING BETWEEN DIFFERENTLY-SIZED OPERANDS

FIG. 3

OPERAND AND RESULT FORWARDING BETWEEN DIFFERENTLY SIZED OPERANDS IN A SUPERSCALAR PROCESSOR

BACKGROUND OF THE INVENTION

This invention relates generally to superscalar processors, and more particularly to providing operand and result forwarding between differently sized operands in a superscalar processor.

The efficiency and performance of a processor may be measured in terms of the number of instructions that are executed per cycle. In a superscalar processor, instructions of the same or different types are executed in parallel in multiple execution units. The decoder feeds an instruction queue from which the maximum allowable number of instructions are issued per cycle to available execution units. This is called grouping of the instructions. The average number of instructions in a group, called size, is dependent upon the degree of instruction-level parallelism (ILP) that exists in a program. Data dependencies among instructions usually limit ILP and result, in some cases, in a smaller instruction group size. If two instructions are dependent, they cannot be grouped together since the result of the first (oldest) instruction is needed before the second instruction can be executed, resulting in serial execution.

BRIEF SUMMARY OF THE INVENTION

An exemplary embodiment includes a method for providing operand and result forwarding between differently sized operands in a superscalar processor. The method includes grouping a first set of instructions in a superscalar processor for operand forwarding, and grouping a second set of instructions for result forwarding, the first set of instructions comprising at least a first source instruction having a first operand and a first dependent instruction having a second operand, the first dependent instruction depending from the first source instruction, the first operand having a first size and the second operand having a second size, wherein the first size is different from the second size; the second set of instructions comprising at least a second source instruction having a third operand and a second dependent instruction having a fourth operand, the second dependent instruction depending from the second source instruction, the third operand having a third size and the fourth operand having a fourth size, wherein the third size is different from the fourth size; performing operand forwarding by forwarding the first operand, either whole or in part, as it is being read to the first dependent instruction prior to execution; performing result forwarding by forwarding a result of the second source instruction, either whole or in part, to the second dependent instruction, after execution; wherein the operand forwarding is performed by executing the first source instruction together with the first dependent instruction, thereby bypassing an execution stage of the first dependent instruction; and wherein the result forwarding is performed by executing the second source instruction together with the second dependent instruction, thereby bypassing an execution stage of the second dependent instruction.

A system, a computer program product, and a hardware product corresponding to the above-summarized method is also described and claimed herein. Other systems, methods, and/or computer program or hardware products according to embodiments will be or become apparent to one with skill in the art upon review of the following drawings and detailed description. It is intended that all such additional systems, methods, and/or computer program or hardware products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides an improved scalar processor that provides operand and result forwarding between differently sized operands. Technical effects and benefits include an enhanced scalar execution unit that improves instruction-level parallelism (ILP) in the presence of fixed-point execution unit (FXU) dependencies by providing a mechanism for result forwarding from a first FXU pipe to a second FXU pipe.

Figure 1A:
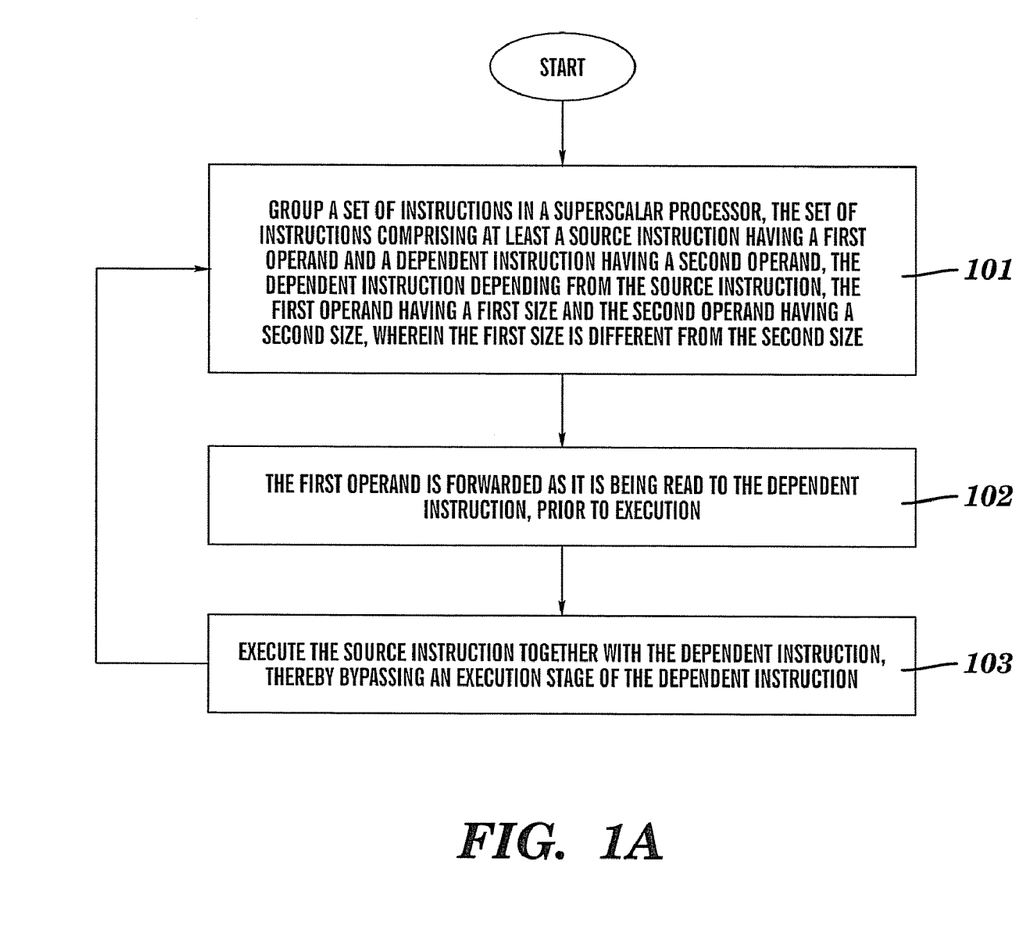
FIG. 1A is a flowchart setting forth an illustrative operational sequence for providing operand forwarding between differently sized operands in a superscalar processor.

FIG. 1A is a flowchart setting forth an illustrative operational sequence for providing operand forwarding between differently sized operands in a superscalar processor. The operational sequence commences at block 101 where a set of instructions are grouped in a superscalar processor. The set of instructions comprise at least a source instruction having a first operand and a dependent instruction having a second operand. The dependent instruction depends from the source instruction. The first operand has a first size and the second operand has a second size, wherein the first size is different from the second size.

The operational sequence progresses to block 102 where the first operand is forwarded as it is being read to the dependent instruction, prior to execution. Next, at block 103, the source instruction is executed together with the dependent instruction, thereby bypassing an execution stage of the dependent instruction. In this manner, operand forwarding is provided between differently sized operands in a superscalar processor.

Figure 1B:
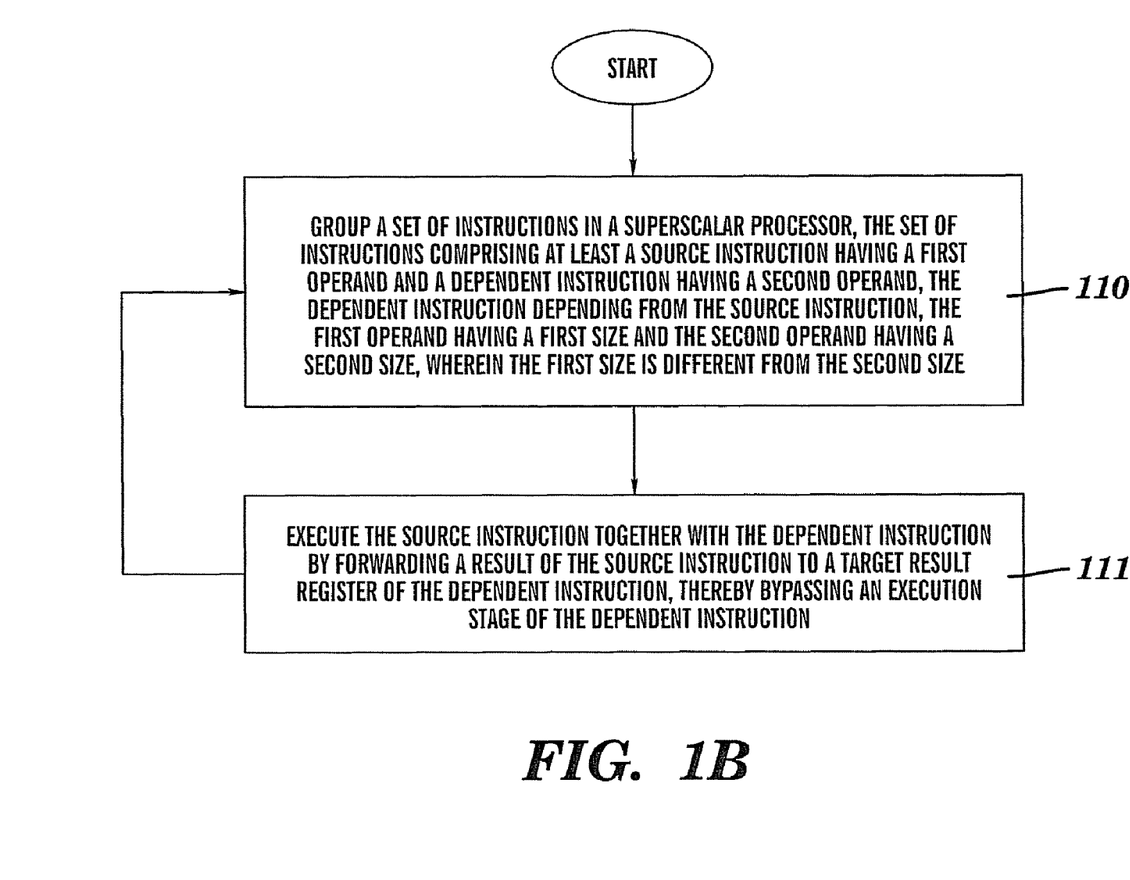
FIG. 1B is a flowchart setting forth an illustrative operational sequence for providing result forwarding between differently sized operands in a superscalar processor.

FIG. 1B is a flowchart setting forth an illustrative operational sequence for providing result forwarding between differently sized operands in a superscalar processor. The operational sequence commences at block 110 where a set of instructions are grouped in a superscalar processor. The set of instructions comprise at least a source instruction having a first operand and a dependent instruction having a second operand. The dependent instruction depends from the source instruction. The first operand has a first size and the second operand has a second size, wherein the first size is different from the second size.

The operational sequence progresses to block 111 where the source instruction is executed together with the dependent instruction by forwarding a result of the source instruction to a target result register of the dependent instruction, thereby bypassing an execution stage of the dependent instruction. In this manner, result forwarding is provided between differently sized operands in a superscalar processor.

Figure 2A:
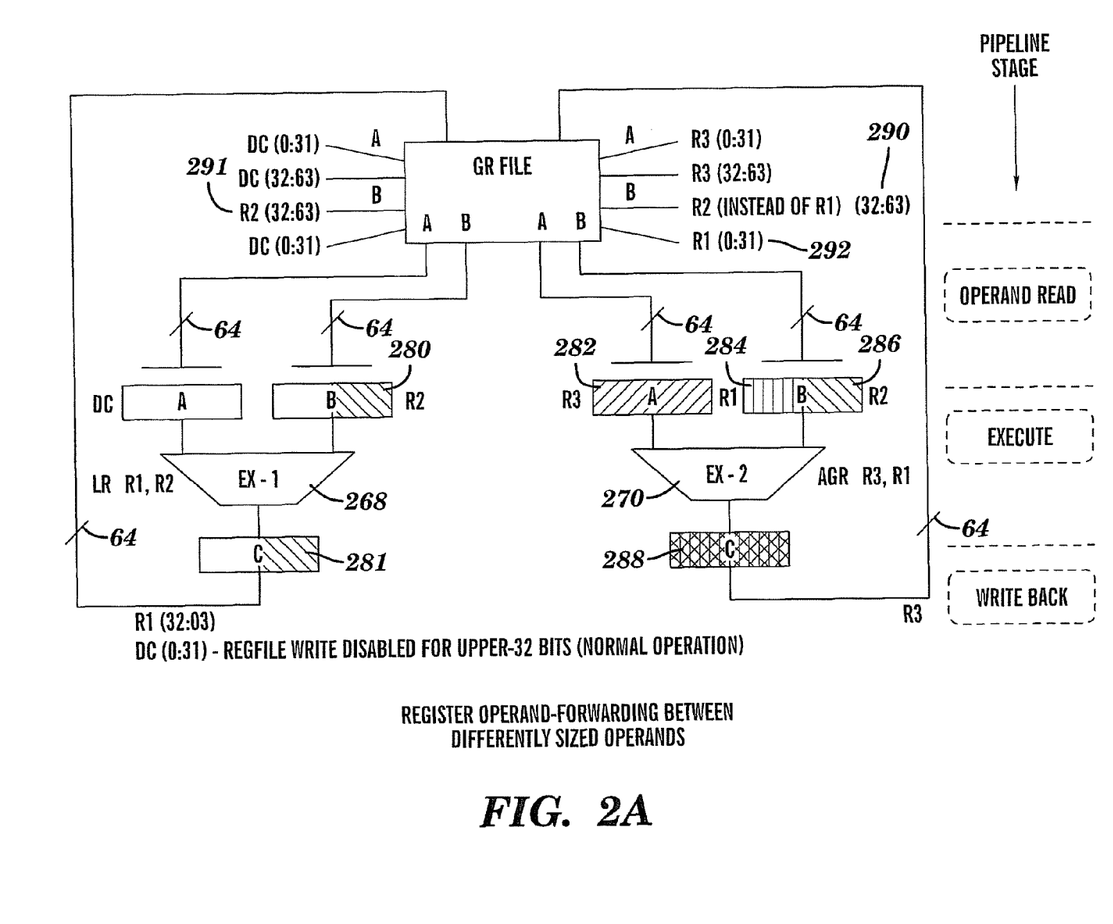
FIG. 2A is a hardware block diagram setting forth an illustrative operational sequence for providing operand forwarding between differently sized operands in a superscalar processor.

FIG. 2A is a hardware block diagram showing a logic circuit for providing operand forwarding between differently sized operands in a superscalar processor. Consider two superscalar fixed-point execution units such as EX-1 268 and EX-2 270, and two superscalar-executable instructions, a source instruction and a dependent instruction that depends from the source instruction. Thus, the dependent instruction is younger than the source instruction. Normally, a dispatch logic circuit would evaluate the source instruction and the dependent instruction for grouping. Pursuant to prior art techniques, the dispatch logic circuit would detect an inter-group dependency between the source instruction and the dependent instruction, requiring that the source instruction and the dependent instruction be split across two groups.

By contrast, using the techniques disclosed herein, if the source instruction belongs to a category of non-working instructions that, when executed in EX-1 268, may forward operands to any younger instruction (such as the dependent instruction) executing concurrently in EX-2 270 with which it is grouped, then a group formation that includes the source instruction and the dependent instruction is permitted. A non-working instruction is defined as an instruction that transfers operand data from one location to another, but does not perform substantive operations on the data. A working instruction generates new data in response to operand data or modifies operand data. The phrase "any younger instruction" signifies no limitation on the dependent instruction in terms of operand size.

For example, consider that the source instruction executed in EX-2 268 is an "LR R1, R2" (load register 32-bit) that reads a lower half of general register (GR) R2 280 and writes a lower half of GR R1 281. The dependent instruction executed in EX-2 270 is an "AGR R3, R1" (add register 64-bit), that reads both halves of R1 (284 and 286), reads both halves of GR R3 282, adds them together, and writes the result back into both halves of R1 288. Since the LR copies the lower half of R2 280 into the lower half of R1 281, operand forwarding is effected by modifying the lower half of AGR's R1-read address 290 to mirror LR's R2-read address 291, thereby accessing the same data (280 and 286); when combined with R1's upper half contents 284 (addressed independently 292) which aren't dependent on the LR, the correct 64-bit R1-equivalent data is supplied as input to EX-2 270, as if the LR had already executed. Since the upper 32 bits of R1 284 sourced by the AGR are not dependent upon the LR, hence the involvement of differently-sized operands.

The diagonal cross-hatching of FIG. 2A emphasizes this scenario and the flow of register data into both the LR and the AGR into the final R1-write value of the LR 281. Vertical hatching is used to denote R1's upper half pre AGR execution. Diagonal hatching from the lower right to the upper left is used to denote R2's lower-half both before and after execution of the LR and AGR, and R1's lower-half post LR-execution. Since the lower half of R2 holds the same contents as R1 post LR execution as emphasized by matching cross-hatching, and since AGR's R1-upper-half is not dependent upon the LR, the AGR is able to use R2's lower-half pre LR-execution contents as input instead of R1's lower half, effecting differently-sized operand forwarding from the LR to the AGR. For completeness, R3 is shown as diagonal hatching from the lower left to the upper right to distinguish itself, AGR's execution output 288 is multi-hatched to distinguish itself, and don't-care (DC) data is unshaded.

Figure 2B:
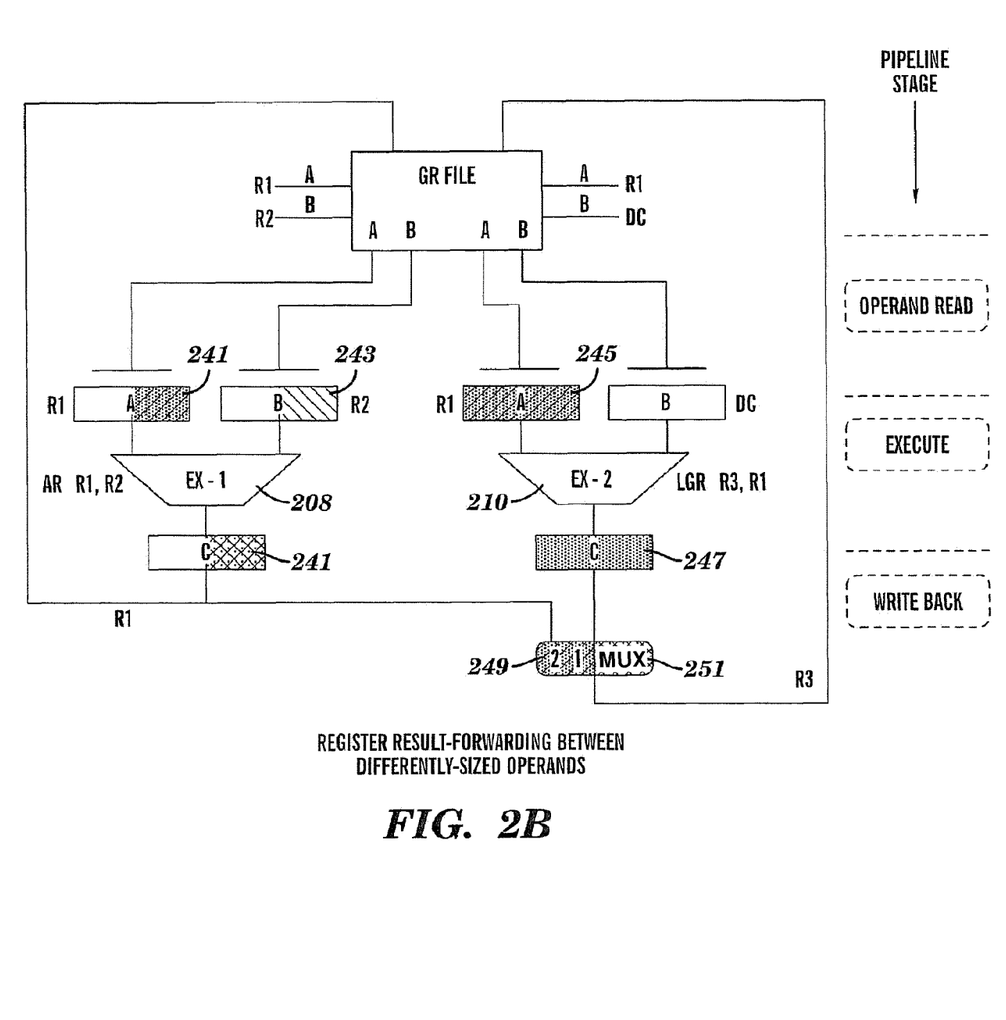
FIG. 2B is a hardware block diagram setting forth an illustrative operational sequence for providing result forwarding between differently sized operands in a superscalar processor.

FIG. 2A shows operand-register forwarding by changing a register-read address as an example. The same can be embodied by placing four muxes, one per half per EX-2 270's input registers and double-dropping EX-1's 268 register input lines into these muxes in conjunction with EX-2 270's existing input lines, thereby embodying operand forwarding by changes in the mux select lines rather than changing the regfile read addresses. Similar means are required to forward operand data from sources other than a regfile (i.e, data delivered by a local cache). These embodiments are anticipated and are covered by the spirit of this application. FIG. 2B is a hardware block diagram showing a logic circuit for providing result forwarding between differently sized operands in a superscalar processor. Consider two superscalar fixed-point execution units such as EX-1 208 and EX-2 210, and two superscalar-executable instructions, a source instruction and a dependent instruction that depends from the source instruction. Thus, the dependent instruction is younger than the source instruction. Normally, a dispatch logic circuit would evaluate the source instruction and the dependent instruction for grouping. Pursuant to prior art techniques, the dispatch logic circuit would detect an inter-group dependency between the source instruction and the dependent instruction, requiring that the source instruction and the dependent instruction be split across two groups.

By contrast, using the techniques disclosed herein, if the dependent instruction belongs to a category of non-working instructions that, when executed in EX-2 210, may receive forwarded results from any older instruction (such as the source instruction) executing concurrently in EX-1 208 with which it is grouped, then a group formation that includes the source instruction and the dependent instruction is permitted. A non-working instruction is defined as an instruction that transfers operand data from one location to another, but does not perform substantive operations on the data. A working instruction generates new data in response to operand data or modifies operand data. The phrase "any older instruction" signifies no limitation on the source instruction in terms of operand size.

For example, consider that the source instruction executed in EX-1 208 is an "AR R1, R2" (add register 32-bit) that reads a lower half 241 of general register (GR) R1, reads a lower half 243 of GR R2, adds them together, and writes the result back into the lower half of R1 241. The dependent instruction executed in EX-2 210 is an "LGR R3, R1" (load register 64-bit) that reads all bits of R1 245 and writes all of the bits unchanged (i.e, copies the bits into) R3 247. Thus, the lower 32 bits of R1 241 make the LGR of the dependent instruction dependent upon the AR of the source instruction. The upper 32 bits of R1 241 sourced by the LGR are not dependent upon the AR, hence the involvement of differently-sized operands.

The diagonal cross-hatching of FIG. 2B emphasizes this scenario and the flow of register data from both the AR and the LGR into the final R3-write value of the LGR comprising an upper half 249 and a lower half 251. Diagonal hatching from the lower left to the upper right is used to denote R1. The upper half 249 of R3 is a copy of the upper half of R1 241, but the lower half 251 of R3 is result forwarded from the execution output of the AR, shown as diagonal hatching from the lower left to the upper right superimposed with diagonal hatching from the lower right to the upper left, thus comprising diagonal cross-hatching. A "B" register input to EX-1 (AR) 243 is shown in diagonal hatching from the lower right to the upper left, to further distinguish it from R1, and the "B" register input to EX-2 (LGR) is not shaded as it is a don't care (DC) condition.

As shown in FIG. 2B, the upper half 249 of R3 and the lower half 251 of R3 are generated using two 2-1 muxes, one mux to select an upper half from either EX-1 208 or EX-2 210, and another mux for selecting a lower half from either EX-1 208 or EX-2 210. The muxes facilitate result forwarding and allow the merging of results between differently-sized operands to formulate the final execution results of EX-2 210.

Figure 3:
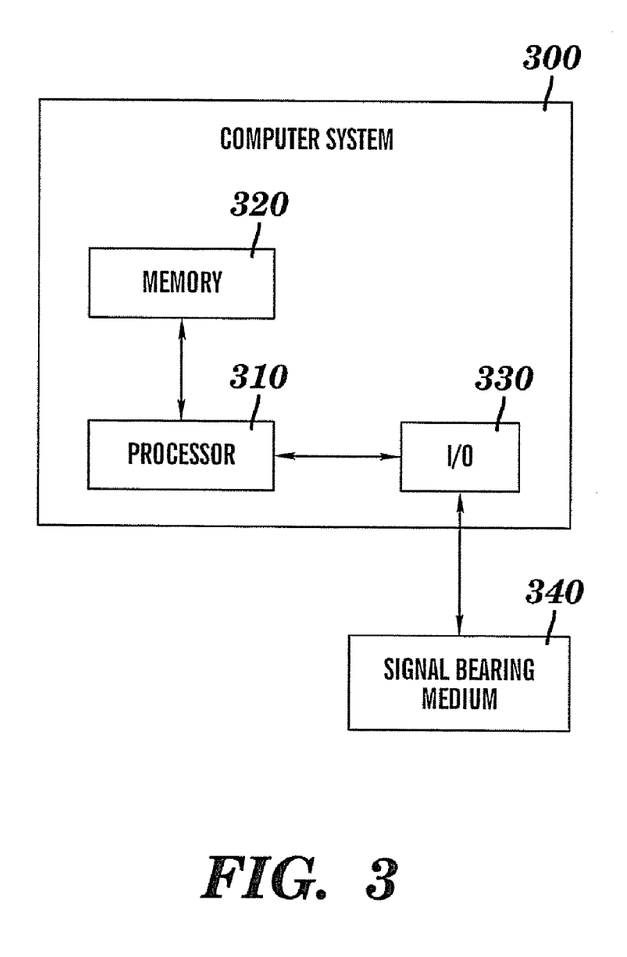
FIG. 3 shows a computer program product for providing operand and result forwarding between differently sized operands in a superscalar processor.

FIG. 3 shows a computer program product for providing operand and result forwarding between differently sized operands in a superscalar processor. The system includes a computer 300 operatively coupled to a signal bearing medium 340 via an input/output interface (I/O) 330. The signal bearing medium 340 may include a representation of instructions for providing operand and result forwarding between differently sized operands in a superscalar processor, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for providing operand and result forwarding between differently sized operands in a superscalar processor, wherein the information is represented, e.g., on the signal bearing medium 340 and communicated to the computer 300 via the I/O 330, wherein the processor 310 saves information as appropriate into a memory 320. Returning now to FIG. 3, this information may also be saved into the memory 320, e.g., via communication with the I/O 330 and the signal bearing medium 340.

The processor 310 executes a program for providing operand and result forwarding between differently sized operands in a superscalar processor. The processor 310 implements instructions for grouping a first set of instructions in a superscalar processor for operand forwarding, and a second set of instructions for result forwarding, the first and second sets of instructions comprising at least a source instruction having a first operand and a dependent instruction having a second operand, the dependent instruction depending from the source instruction, the first operand having a first size and the second operand having a second size, wherein the first size is different from the second size. In the case of operand forwarding, the first operand is forwarded, either whole or in part, as it is being read to the dependent instruction, prior to execution. In the case of result forwarding, the result of the source instruction, either whole or in part, is forwarded to the dependent instruction, after execution. In both operations, the source instruction is executed together with the dependent instruction, thereby bypassing an execution stage of the dependent instruction. The foregoing steps may be implemented as a program or sequence of instructions within the memory 320, or on a signal bearing medium, such as the medium 340, and executed by the processor 310.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing operand and result forwarding between differently sized operands in a superscalar processor, the method including:

grouping a first set of instructions in a superscalar processor for operand forwarding, and grouping a second set of instructions for result forwarding, the first set of instructions comprising at least a first source instruction having a first operand and a first dependent instruction having a second operand, the first dependent instruction depending from the first source instruction, the first operand having a first size and the second operand having a second size, wherein the first size is different from the second size; the second set of instructions comprising at least a second source instruction having a third operand and a second dependent instruction having a fourth operand, the second dependent instruction depending from the second source instruction, the third operand having a third size and the fourth operand having a fourth size, wherein the third size is different from the fourth size;

performing operand forwarding by forwarding the first operand, either whole or in part, as it is being read to the first dependent instruction prior to execution;

performing result forwarding by forwarding a result of the second source instruction, either whole or in part, to the second dependent instruction, after execution;

wherein the operand forwarding is performed by executing the first source instruction together with the first dependent instruction, thereby bypassing an execution stage of the first dependent instruction;

wherein the result forwarding is performed by executing the second source instruction together with the second dependent instruction, thereby bypassing an execution stage of the second dependent instruction; and wherein the second dependent instruction does not generate new data in response to operand data, and does not modify operand data.

2. The method of claim 1 further including forwarding the result of the second source instruction from a first fixed point execution unit to a second fixed point execution unit.

3. The method of claim 1 wherein the second dependent instruction is a non-working instruction that transfers operand data from one location to another.

4. The method of claim 1 wherein the second dependent instruction does not perform any substantive operations on the data.

5. A system for providing operand and result forwarding between differently sized operands in a superscalar processor, the system including:
- a dispatch logic mechanism for grouping a first set of instructions in a superscalar processor for operand forwarding, and grouping a second set of instructions for result forwarding, the first set of instructions comprising at least a first source instruction having a first operand and a first dependent instruction having a second operand, the first dependent instruction depending from the first source instruction, the first operand having a first size and the second operand having a second size, wherein the first size is different from the second size; the second set of instructions comprising at least a second source instruction having a third operand and a second dependent instruction having a fourth operand, the second dependent instruction depending from the second source instruction, the third operand having a third size and the fourth operand having a fourth size, wherein the third size is different from the fourth size;
- a plurality of fixed-point execution units, operatively coupled to the dispatch logic mechanism, for executing the first source instruction together with the first dependent instruction and for executing the second source instruction together with the second dependent instruction;

wherein operand forwarding is performed by forwarding the first operand, either whole or in part, as it is being read to the first dependent instruction prior to execution;

wherein result forwarding is performed by forwarding a result of the second source instruction, either whole or in part, to the second dependent instruction, after execution;

wherein the operand forwarding is performed by executing the first source instruction together with the first dependent instruction, thereby bypassing an execution stage of the first dependent instruction;

wherein the result forwarding is performed by executing the second source instruction together with the second dependent instruction, thereby bypassing an execution stage of the second dependent instruction; and wherein the second dependent instruction does not generate new data in response to operand data, and does not modify operand data.

6. The system of claim 5 wherein the dispatch logic mechanism forwards the result of the first or second source instruction from a first fixed point execution unit to a second fixed point execution unit.

7. The system of claim 5 wherein the second dependent instruction is a non-working instruction that transfers operand data from one location to another.

8. The system of claim 5 wherein the second dependent instruction does not perform any substantive operations on the data.

9. A computer program product comprising a storage medium readable by a processing circuit and storing instructions for execution by the processing circuit for facilitating a method for providing operand and result forwarding between differently sized operands in a superscalar processor, the method including:
- grouping a first set of instructions in a superscalar processor for operand forwarding, and grouping a second set of instructions for result forwarding, the first set of instructions comprising at least a first source instruction having a first operand and a first dependent instruction having a second operand, the first dependent instruction depending from the first source instruction, the first operand having a first size and the second operand having a second size, wherein the first size is different from the second size; the second set of instructions comprising at least a second source instruction having a third operand and a second dependent instruction having a fourth operand, the second dependent instruction depending from the second source instruction, the third operand having a third size and the fourth operand having a fourth size, wherein the third size is different from the fourth size;
- performing operand forwarding by forwarding the first operand, either whole or in part, as it is being read to the first dependent instruction prior to execution;
- performing result forwarding by forwarding a result of the second source instruction, either whole or in part, to the second dependent instruction, after execution;
- wherein the operand forwarding is performed by executing the first source instruction together with the first dependent instruction, thereby bypassing an execution stage of the first dependent instruction;
- wherein the result forwarding is performed by executing the second source instruction together with the second dependent instruction, thereby bypassing an execution stage of the second dependent instruction; and
- wherein the second dependent instruction does not generate new data in response to operand data, and does not modify operand data.

10. The computer program product of claim 9 further including instructions for forwarding the result of the second source instruction from a first fixed point execution unit to a second fixed point execution unit.

11. The computer program product of claim 9 wherein the second dependent instruction is a non-working instruction that transfers operand data from one location to another.

12. The computer program product of claim 9 wherein the second dependent instruction does not perform any substantive operations on the data.

13. A hardware product comprising a storage medium readable by a processing circuit and storing instructions for execution by the processing circuit for facilitating a method for providing operand and result forwarding between differently sized operands in a superscalar processor, the method including:
- grouping a first set of instructions in a superscalar processor for operand forwarding, and grouping a second set of instructions for result forwarding, the first set of instructions comprising at least a first source instruction having a first operand and a first dependent instruction having a second operand, the first dependent instruction depending from the first source instruction, the first operand having a first size and the second operand having a second size, wherein the first size is different from the second size; the second set of instructions comprising at least a second source instruction having a third operand and a second dependent instruction having a fourth operand, the second dependent instruction depending from the second source instruction, the third operand having a third size and the fourth operand having a fourth size, wherein the third size is different from the fourth size;

performing operand forwarding by forwarding the first operand, either whole or in part, as it is being read to the first dependent instruction prior to execution;

performing result forwarding by forwarding a result of the second source instruction, either whole or in part, to the second dependent instruction, after execution;

wherein the operand forwarding is performed by executing the first source instruction together with the first dependent instruction, thereby bypassing an execution stage of the first dependent instruction;

wherein the result forwarding is performed by executing the second source instruction together with the second dependent instruction, thereby bypassing an execution stage of the second dependent instruction; and wherein the second dependent instruction does not generate new data in response to operand data, and does not modify operand data.

14. The hardware product of claim 13 further including instructions for forwarding the result of the second source instruction from a first fixed point execution unit to a second fixed point execution unit.

15. The hardware product of claim 13 wherein the second dependent instruction is a non-working instruction that transfers operand data from one location to another.

16. The hardware product of claim 13 wherein the second dependent instruction does not perform any substantive operations on the data.

* * * * *